United States Patent [19]

Kolakowski et al.

[11] 4,039,487

[45] Aug. 2, 1977

[54] CELLULAR ISOCYANURATE POLYMER

[75] Inventors: Richard A. Kolakowski, Northford; Harold E. Reymore, Jr., Wallingford, both of Conn.; Adnan A. R. Sayigh, North Haven, Conn., by Anne B. Sayigh, conservatrix

[73] Assignee: The Upjohn Company, Kalamazoo, Mich.

[21] Appl. No.: 650,453

[22] Filed: Jan. 19, 1976

[51] Int. Cl.$^2$ .............................................. C08G 18/42
[52] U.S. Cl. ...................... 260/2.5 AW; 260/2.5 AN
[58] Field of Search ................. 260/2.5 AN, 2.5 AW, 260/2.5 AM

[56] References Cited

U.S. PATENT DOCUMENTS

| 3,072,614 | 1/1963 | Bolton | 260/2.5 AM |
|---|---|---|---|
| 3,431,223 | 3/1969 | Reymore | 260/2.5 AN |
| 3,502,601 | 3/1970 | Case | 260/2.5 AN |
| 3,572,417 | 3/1971 | Wismer | 260/2.5 AW |
| 3,620,986 | 11/1971 | Diehr | 260/2.5 AW |
| 3,642,646 | 2/1972 | Marcus | 260/2.5 AN |
| 3,745,133 | 7/1973 | Comunale | 260/2.5 AW |
| 3,755,212 | 8/1973 | Dunlap | 260/2.5 An |
| 3,909,465 | 9/1975 | Wiedermann | 260/2.5 AW |

FOREIGN PATENT DOCUMENTS 908,337  10/1962  United Kingdom ......... 260/2.5 AW

*Primary Examiner*—C. Warren Ivy
*Attorney, Agent, or Firm*—James S. Rose; Denis A. Firth

[57] ABSTRACT

Polyisocyanurate foams are disclosed which are characterized by low Flame Spread Ratings and low smoke generation values, as determined by the Underwriter's Laboratory Tunnel Test in accordance with the ASTM E-84 test procedure. The smoke and flame resistant properties are achieved, not through the use of flame retardants or additives, but rather by the use of a minor amount of a hydroxyl terminated aromatic polyester having a hydroxyl equivalent weight from about 150 to about 500 and which is the product of the reaction of an excess of a polyethyleneglycol having an equivalent weight from about 75 to about 225, with an aromatic polycarboxylic compound.

11 Claims, No Drawings

CELLULAR ISOCYANURATE POLYMER

BACKGROUND OF THE INVENTION

1. Field of the Invention

This invention relates to the preparation of polymer foams and is more particularly concerned with polyisocyanurate foams which have a high degree of fire resistance and generate low smoke levels during combustion.

2. Description of the Prior Art

Cellular polymers in which the major recurring polymer unit is isocyanurate, are well known and widely used in the art; see for example U.S. Pat. Nos. 3,516,950, 3,625,872, 3,644,232, 3,676,380, 3,725,319, 3,745,133, 3,763,057, 3,793,236, 3,799,896, 3,849,349, 3,876,568, 3,891,579, and 3,909,465. Generally speaking, the polyisocyanurate foams prepared in accordance with the prior art are found to be more fire resistant, in comparison to polyurethane foams, when subjected to various testing procedures known and used in the foam art. Unfortunately, smoke generation during combustion of such cellular polymers has remained a problem. Prior art methods for lowering the smoke have included the addition of various classes of adjuvants, including inorganic fillers, graphite powder, various types of fluoroborate salts, sulfur, and the like. The use of these methods add to the cost of manufacturing the foams and, generally speaking, detract in one way or another from their physical properties. Furthermore, U.S. Pat. No. 3,644,232 discloses that foams prepared from commercially available polymethylene poly(phenylisocyanates) pop and burst into fragments when subjected to a flame and give rise to a lot of smoke and noxious fumes.

British Patents 1,223,415 and 1,404,822 describe the use of minor amounts of polyester polyols, prepared from aliphatic dicarboxylic acids and a broad class of aliphatic polyols, in a process for producing polyisocyanurate foams with minimum brittleness in addition to the expected fire retardent properties.

We have now found, quite unexpectedly, polyisocyanurate foams which possess a high degree of fire resistance and generate very low smoke levels upon combustion, in the absence of any additional smoke, or fire retardant additives. This advantageous feature is achieved by the inclusion in the foam formulations, which call for a polymethylene poly(phenylisocyanate), of a minor amount of a polyol selected from a very narrow class of polyols, heretofore not recognized by the prior art reference as possessing this ability. The foams are further characterized by good physical properties.

SUMMARY OF THE INVENTION

This invention comprises a polymer in which the major recurring polymer unit is isocyanurate which polymer comprises the reaction product obtained by bringing together a polymethylene poly(phenylisocyanate), a trimerization catalyst and a minor amount of a polyol wherein the improvement comprises employing as the polyol component from about 0.05 hydroxyl equivalent to about 0.20 hydroxyl equivalent per equivalent of said polymethylene poly(phenylisocyanate) of a polyol having a hydroxyl equivalent weight from about 150 to about 500 provided the polyol is present in a weight from about 10 to about 30 parts per equivalent of said isocyanate and said polyol is obtained by the reaction of:

a. an excess of a polyethyleneglycol having a hydroxyl equivalent weight from about 75 to about 225; and b. an aromatic polycarboxylic compound containing from two to three carboxylic groups.

The invention also comprises an improved cellular polymer in which the major recurring polymer unit is isocyanurate.

DETAILED DESCRIPTION OF THE INVENTION

It is an object of the present invention to provide polymers in which the major recurring polymer unit is isocyanurate. It is a further object to provide polyisocyanurate polymers that are possessed of a high degree of fire resistance and in addition generate low levels of smoke when combusted. It is still a further object to provide polyisocyanurate cellular polymers suitable as insulating materials and possessing the foregoing characteristics without resorting to the use of expensive, or intractable, additives.

Foams obtained in accordance with the present invention are characterized by Flame Spread Rating (FSR) values no greater than 25 when tested in accordance with the ASTM E-84 Underwriter's Laboratory Tunnel Test. They are further characterized by low smoke generation values when measured concurrently with the FSR determinations during the same ASTM E-84 test procedure. A smoke value of 50 or less is normally associated with an insulation material such as fiberglass and foams of the present invention have been shown to reach values as low as 50, and in some cases even lower.

The novelty of the present invention resides in the selection of a very narrow class of aromatic polyester polyols, which will be discussed in detail hereinbelow, to be used in minor amounts in combination with a polymethylene poly(phenylisocyanate), a blowing agent, and a catalyst capable of trimerizing the isocyanate groups to form polyisocyanurates, as well as catalyzing the reaction of isocyanate groups with the hydroxyl groups to form polyurethanes.

The polyisocyanates employed in the preparation of polyisocyanurate foams in accordance with the present invention can be any of the polymethylene poly(phenylisocyanates) conventionally employed in the art for this purpose previously. A preferred group of polymethylene poly(phenylisocyanates) are those set forth in U.S. Pat. No. 3,745,133 and incorporated herein by reference. A preferred form of polymethylene poly(phenylisocyanate) is one having an acidity, expressed as "% hot HCl" of less than about 0.1%; see U.S. Pat. No. 3,793,362 for the method of treating polyisocyanates with a minor amount of a monomeric epoxide to lower the hot HCl content, which disclosure is incorporated herein by reference.

A particularly preferred group of polyisocyanates are those which contain from about 35 percent to about 85 percent by weight of methylenebis (phenylisocyanate), the balance of the mixture being polymethylene poly(phenylisocyanates) of functionality higher than 2. A most preferred polyisocyanate is one which contains from about 45 to about 50 percent by weight of methylenebis(phenylisocyanate) and the balance having a functionality higher than 2.

Catalysts and the amounts thereof for the combined trimerization and urethane reaction can be any of the catalysts previously employed in the art for this purpose, see for example the list of U.S. patents cited hereinabove. Thus the catalysts and amounts disclosed in U.S. Pat. No. 3,745,133, already incorporated herein by reference, are illustrative of those which are useful in carrying out the teachings of the present invention. A preferred group of catalysts are those disclosed and claimed in U.S. Pat. Nos. 3,896,052, 3,899,443, and 3,903,018, whose disclosures are incorporated herein by reference. A most preferred group of catalysts are the cocatalyst combinations set forth in detail in U.S. Pat. No. 3,903,018 which comprise a monomeric epoxide, a tertiary amine trimerization catalyst containing a dimethylamino group, and a glycine salt having the formula

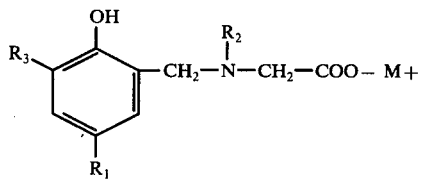

wherein M is an alkali metal, $R_1$ is selected from the class consisting of hydrogen and alkyl having from 1 to 12 carbon atoms, inclusive, $R_2$ is selected from the class consisting of hydrogen, alkyl having from 1 to 12 carbon atoms, inclusive, and —$CH_2$—$COO^-$ $M^+$, and $R_3$ is selected from the class consisting of hydrogen and the group

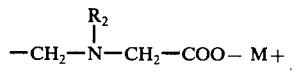

A particularly preferred cocatalyst combination is comprised of a mixture of (i) a glycidyl ether of a novolac resin having a functionality of at least 2, (ii) N,N-dimethylcyclohexylamine, and (iii) sodium N-(2-hydroxy-5-nonylphenyl)-methyl-N-methyl glycinate.

For each equivalent of polyisocyanate present in the reaction mixture, there is employed from about 0.001 to about 0.02 equivalent, preferably from about 0.002 to about 0.01 equivalent, of said tertiary amine component; from about 0.001 to about 0.02 equivalent, preferably from about 0.003 to about 0.01 equivalent, of said glycine salt; and from about 0.01 to about 0.06 equivalent, preferably from about 0.02 to about 0.05 equivalent, of said epoxide component.

While the catalyst combination described hereinabove specifically requires the use of three different catalyst components in combination, it is to be understood that this does not exclude the presence in the catalyst combination of additional components or agents capable of causing the trimerization of a polyisocyanate provided the three components discussed above are present.

The polyester polyols employed in the present invention are obtained by the reaction of an excess (as hereinafter defined) of a polyethyleneglycol with an aromatic polycarboxylic compound under normal esterification conditions well known in the art. Thus excess glycol assures both low polyester product molecular weight with concomitant tractable viscosity, and the presence of essentially only hydroxyl end groups and a low acid number preferably below about 2. Hydroxyl equivalent weight of the polyethyleneglycol employed is advantageously from about 75 to about 225, and preferably from about 85 to about 120.

The polyethyleneglycols used are prepared by the addition of ethylene oxide to water, ethylene glycol, or diethylene glycol. Standard oxyalkylation procedures well known in the art are used and ethoxylation is carried out so as to achieve a glycol molecular weight from about 150 to about 450, and preferably from about 170 to about 240. It will be readily apparent to those skilled in the art that the glycols thereby produced consist of a distribution of different molecular weight species whose average molecular weight fall within the limits set forth herein. However, the polyethyleneglycols useful in the preparation of the polyester diols are not limited to this type of glycol mixture. The single species of glycols which fall within the molecular weight range set forth herein are also useful. Exemplary of such glycols are triethyleneglycol, tetraethyleneglycol, and pentaethyleneglycol, and the like. A preferred group of glycols consists of tetraethyleneglycol, and the polyethylene glycol having an average molecular weight from about 190 to about 210.

The aromatic polycarboxylic compounds employed in the preparation of the polyesters contain from two to three carboxylic groups either in the form of the free acids or the corresponding anhydrides thereof. The term "aromatic" means an aromatic nucleus having from 6 to 12 carbon atoms and is inclusive of benzene, toluene, xylene, naphthalene, and nucleii having the formula

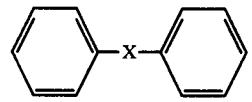

wherein X is selected from the group consisting of —$SO_2$—,

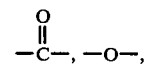

—O—, lower alkylene from $C_1$ to $C_4$, and a direct linkage between the two benzene nucleii. It will be readily apparent to one skilled in the art that all of the carboxylic groups need not be substituted on the same aromatic ring and the aromatic nucleus can be additionally substituted by other groups so long as the additional groups are not reactive with carboxylic, or hydroxyl groups.

Illustrative of the aromatic polycarboxylic compounds containing two carboxylic groups are:
 isophthalic acid
 terephthalic acid
 phthalic acid and the anhydride thereof
 3,4-toluenedicarboxylic acid and the anhydride thereof
 1,5-naphthalenedicarboxylic acid
 4,4'-dicarboxydiphenyl
 4,4'-dicarboxydiphenylsulfone
 4,4'-dicarboxybenzophenone
 4,4'-dicarboxydiphenylether
 4,4'-dicarboxydiphenylmethane Illustrative of the aromatic polycarboxylic compounds containing three carboxylic groups are:
 trimellitic acid and the anhydride thereof
 hemimellitic acid and the anhydride thereof trimesic acid.

A preferred group of polycarboxylic compounds consists of phthalic acid, isophthalic acid, terephthalic acid, trimellitic acid, hemimellitic acid, and the corresponding anhydrides thereof. A particularly preferred group consists of phthalic acid, trimellitic acid, and the corresponding anhydrides thereof.

The molar proportions of polyethyleneglycol and polycarboxylic compound employed are such that there is an excess of glycol over the stoichiometric amount of one mole of glycol required for reaction with each carboxylic group present in the polycarboxylic compound. It will be readily apparent to one skilled in the art that the term carboxylic group refers to the carbonyl function regardless of whether it appears as part of an anhydride or, as a free acid. In the case of a difunctional polycarboxylic compound such as phthalic anhydride, or its free acid, the stoichiometric molar requirement of glycol to polycarboxylic compound is 2 to 1; and for a trifunctional compound such as trimellitic anhydride, or its free acid the stoichiometric molar requirement is 3 to 1.

The excess of glycol over the stoichiometric molar requirement for reaction with the polycarboxylic compound is advantageously from about 0.1 molar to about 0.7 molar, and preferably from about 0.2 molar to about 0.6 molar.

The reaction between the glycol and the anhydride is carried out under normal esterification conditions well known and described in the prior art; see for example Polyurethanes Chemistry and Technology, Part I, pages 45–46, 1962, J. H. Saunders and K. C. Frisch, John Wiley & Sons, New York, N.Y. Illustratively, the esterification is conducted in the absence of solvent under a flow of nitrogen and at temperatures from about 150° C to about 250° C, preferably from about 175° C to about 225° C for a period from about 10 hours to about 40 hours, preferably from about 15 hours to about 35 hours. The acid number of the product is usually from about 1 to about 4 and preferably is below about 2. During the reaction period, water which is formed is removed overhead.

Advantageously, catalysts are employed which shorten the esterification period. Exemplary catalysts are p-toluenesulfonic acid, magnesium oxide, calcium oxide, antimony oxide, zinc oxide, lead oxide, magnesium acetate, calcium acetate, zinc acetate, lead acetate, various organic amines, sodium methoxide, potassium methoxide, sodium alkoxytitanates, tetralkyltitanates, and the like. Optionally there can be added to the polyesters, either during preparation of afterwards, preservatives, antioxidants, and other suitable adjuvants.

The polyester polyols produced in accordance with the method outlined hereinabove are characterized by hydroxyl equivalent weight values from about 150 to about 500, and preferably in the range from about 200 to about 300.

In order to obtain the polyisocyanurate foams which possess the flame resistance and low smoke generation in accordance with the present invention, the polyester polyols set forth above are employed in the formulation in the proportions of from about 0.05 hydroxyl equivalent to about 0.20 hydroxyl equivalent per equivalent of polymethylene poly(phenylisocyanate) and preferably from about 0.06 to about 0.16 hydroxyl equivalent with the proviso that the polyol is present in a weight from about 10 to about 30 parts per equivalent of said isocyanate.

In carrying out the preparation of polyisocyanurate foams in accordance with the process of the invention, the procedures and equipment conventional in the art are employed.

Foaming agents, and other optional additives such as dispersing agents, cell stabilizers, surfactants, flame retardants, and the like, can be employed according to the teachings of the incorporated references. A preferred class of flame retardant additives is the phosphorus containing flame retardants such as: tris(2-chloroethyl)-phosphate, tris(2-chloropropyl)phosphate, tris(2,3-dibromopropyl)phosphate, tris(1,3-dichloroisopropyl)phosphate, and the like.

The cellular products of the invention can be employed for all the purposes for which the currently produced cellular products are conventionally employed and are particularly suitable for applications where a high degree of thermal resistance, low flame spread and low smoke generation on combustion are required. For example, the cellular products of the invention can be employed as thermal barriers and insulating materials for high temperature pipe lines and ovens, for insulative barriers for storage tanks containing materials at elevated temperatures; and are particularly useful in producing relatively flame resistant laminate boards in the construction of industrial buildings.

The preparation of non-cellular polymers made in accordance with the present invention is carried out by using standard techniques known to those skilled in the art. Solid polymers are obtained by carrying out the invention in the absence of the blowing agent. The reactants can be cast, molded, coated, or otherwise deposited by methods known to those skilled in the art, to form a solid polyisocyanurate casting, molding, coating, or other form of solid polyisocyanurate. Such products find use for example, in high temperature resistant laminates prepared from reinforcing layers of heat resistant fabric such as glass fabric, graphite fabric, and the like, and layers of polyisocyanurate of the invention.

The following preparations and examples describe the manner and process of making and using the invention and set forth the best mode contemplated by the inventors of carrying out the invention but are not to be construed as limiting.

EXAMPLE 1

This example sets forth two polyisocyanurate foams (Foam A and B of Table I), prepared in accordance with the present invention. Foam A contains a minor amount of an epoxide, namely a glycidyl ether of a novolac resin, while Foam B does not. Both foams are characterized by FSR lower than 25 and Smoke lower than 50.

The foams were prepared using a foam metering and dispensing modulating unit equipped with a pin type impeller rotating at 4,200 rpm (Admiral Equipment Corporation, Akron, Ohio, a Division of the Upjohn Company, Kalamazoo, Mich.) and adapted to mix the four components prepared from the ingredients and proportions (in parts) set forth in Table I. The foam forming mixture was dispensed on a 4 ft. wide conveyor set at a 4.5° angle and moving at 7'/min. Throughput was adjusted to yield a bun height of approximately 15 inches.

TABLE I

| Foams | A | B |
|---|---|---|
| Component A: | | |

TABLE I-continued

| Foams | A | B |
|---|---|---|
| (component temp. = 60° F) | | |
| Polyisocyanate[1] | 134 | 134 |
| L-5340[2] | 2 | 2 |
| R-11-B | 24.5 | 24.5 |
| Component B: | | |
| (component temp. = 70°° F) | | |
| Polyol A[3] | 20 | 20 |
| Component C: | | |
| (component temp. = ambient room) | | |
| DEN-431[4] | 6.0 | — |
| R-11-B | 1.5 | — |
| Component D: | | |
| (component temp. = ambient room) | | |
| Catalyst A[5] | 3.5 | 3.5 |
| Diethyleneglycol | 0.6125 | 0.6125 |
| N,N-Dimethylcyclohexylamine | 0.35 | 0.35 |
| Throughput, lb./min. | 96 | 92.5 |
| Rise Characteristics: | | |
| Cream, sec. | 0:08 | 0:09 |
| Initiation, sec. | 0:12 | 0:13 |
| Gel, min. : sec. | 1:20 | 1:24 |
| Rise, min. : sec. | 2:10 | 2:15 |
| Tack Free, min. : sec. | 8:00 | 9:00 |
| Firm, min. : sec. | 4:00 | 4:00 |
| Foam Properties: | | |
| Density, pcf | 2.09 | 2.09 |
| Compressive str. (psi) | | |
| ∥ to rise | 30.7 | 33.3 |
| ⊥ to rise | 18.2 | 16.6 |
| 300° F. Dry Age ΔVol. (%) | | |
| 1 day | −1.0 | −1.0 |
| 7 days | 3.2 | 3.3 |
| % Closed cells | 92 | 92 |
| Friability[6] (% wt. loss) | 46.3 | 51.8 |
| Oxygen Index[7] (OI) | 27.1 | 27.2 |
| Mine Safety Burn[8] Through (hr./in.) | 0.70 | 0.67 |
| ASTM E-84 Test on 1" thick samples: | | |
| Flame Spread Rating (FSR) | 20.51 | 17.95 |
| Smoke Generated | 40.1 | 44.7 |

Footnotes to Table I:
[1]Polyisocyanate: A polymethylene poly(phenylisocyanate) containing about 45 percent by weight of methylenebis(phenylisocyanate) the balance having a functionality higher than 2; and treated with a minor amount of monomeric epoxide in accordance with U.S. 3,793,362; I.E. = 140; % hot HCl = 0.05.
[2]L-5340: Union Carbide Silicone Surfactant for Rigid Urethane Foam, see Bulletin F-42172A, October, 1970, viscosity of 1,000 cstk. at 25° C.
[3]Polyol A: The polyol arising from the esterification of 1 mole of trimellitic anhydride with 3.54 moles of tetraethyleneglycol; OH E.W. = 210; viscosity = 2,200 cps. at 23° C; acid # = 1.5.
[4]DEN-431: Dow epoxy novolac resin, viscosity of 76,500 cps. at 25° C, see "D.E.N. Epoxy Novolac Resins", The Dow Chemical Company, 1967, pp. 1–2.
[5]Catalyst A: A 50 percent (by wt.) solution of sodium N-(2-hydroxy-5-nonylphenyl)-methyl-N-methyl glycinate in diethylene glycol.
[6]Friability: Percent weight loss of sample as determined in accordance with ASTM Test Method C 421 over a 10 minute period.
[7]Oxygen Index: Flammability test conducted according to the ASTM D-2863 procedure and reported as the percent oxygen content required to sustain sample combustion; the higher the OI the greater the resistance to flammability; unmodified polyurethane foam has OI = 16.5 and materials which have OI values of about 25 are unacceptable when flame retardant materials are required (J. L. Isaacs, J. Fire & Flammability, I, 1970, 36).
[8]Bureau of Mines, flame penetration test.

EXAMPLE 2

Using the procedure and equipment described in Example 1, and the ingredients and proportions (in parts) set forth in Table II, Foams C, D, and E were prepared in accordance with the present invention.

Three different polyols of the type called for by the present invention and exemplified in Polyols B, C, and D were employed. Each foam is characterized by FSR values below 25 and Smoke about 50 respectively. The smoke value of 52.5, in the case of Foam D, is considered to be within the experimental error range for the value of 50. This is further supported by the smoke values for Foams A and B of Example 1 which contained a similarly constituted polyol.

TABLE II

| Foams | C | D | E |
|---|---|---|---|
| Component A: | | | |
| Polyisocyanate | 134 | 134 | 134 |
| L-5340 | 2 | 2 | 2 |
| R-11-B | 24.5 | 24.5 | 24.5 |
| Component B: | | | |
| Polyol B[1] | 22.5(0.0876 eq.) | | |
| Polyol C[2] | | 22.5(0.103 eq.) | |
| Polyol D[3] | | | 20.0(0.0885 eq.) |
| Component C: | | | |
| DEN-431 | 3.0 | 3.0 | 6.0 |
| R-11-B | 0.75 | 0.75 | 1.5 |
| Component D: | | | |
| Catalyst A | 2.49 | 2.49 | 3.0 |
| Diethylene glycol | 0.436 | 0.436 | 0.525 |
| N,N-Dimethylcyclohexylamine | 0.249 | 0.249 | 0.3 |
| Throughput, lb./min. | 121 | 121 | 96 |
| Rise Characteristics: | | | |
| Cream, sec. | 0:11 | 0:12 | 0:12 |
| Initiation, sec. | 0:17 | 0:16 | 0:17 |
| Gel, min. : sec. | 1:31 | 1:31 | 1:27 |
| Rise, min. : sec. | 2:05 | 2:15 | 2:12 |
| Tack Free, min. : sec. | 8:00 | 6:30 | 14:30 |
| Firm, min. : sec. | 4:30 | 7:30 | 3:30 |
| Bun Height, in. | 22 | 22 | 17 |
| Foam Properties: | | | |
| Density, pcf | 2.02 | 2.15 | 2.17 |
| Compressive str. (psi) | | | |
| ∥ to rise | 26.5 | 30.0 | 31.8 |
| ⊥ to rise | 17.1 | 17.9 | 16.1 |
| 300° F Dry Age ΔVol. (%) | | | |
| 1 day | 3.0 | 1.9 | — |
| 7 days | 3.2 | 3.5 | 3.6 |
| Friability (%) | 63.1 | 43.7 | 49.6 |
| OI | 27.1 | 27.1 | 26.9 |
| Mine Safety (hrs./in.) | 0.83 | — | — |
| ASTM E-84 Test on 1" thick samples | | | |
| FSR | 23.1 | 20.5 | 23.1 |
| Smoke | 45 | 52.5 | 47.4 |

Footnotes to Table II:
[1]Polyol B: The polyol arising from the esterification of 1 mole of phthalic anhydride with 2.2 moles of polyethylene glycol of formula molecular weight range = 190–210; OH E.W. = 257; viscosity = 650 cps. at 25° C; acid # = 0.19.
[2]Polyol C: The polyol arising from the esterification of 1 mole of trimellitic anhydride with 3.46 moles of tetraethyleneglycol; OH E.W. = 218; viscosity = 1650 cps. at 25° C; acid # = 0.45.
[3]Polyol D: The polyol arising from the esterification of 1 mole of phthalic anhydride with 2.2 moles of tetraethylene glycol; OH E.W. = 226; viscosity = 616 cps. at 25° C; acid # = 1.17.

EXAMPLE 3

Using the procedure and equipment described in Example 1, except that three component mixing was employed, Foams F and G were prepared but not in accordance with the present invention. The ingredients and proportions (in parts) used are set forth in Table III.

TABLE III

| Foams | F | G |
|---|---|---|
| Component A: | | |
| Polyisocyanate | 134 | 134 |
| L-5340 | 1 | 1 |
| R-11-B | 20 | 26 |
| Component B: | | |
| Polyol E[1] | 25.5 | — |
| Carbowax 400[2] | — | 23 |
| DC-193 | 0.85 | 1.0 |
| DEN-431 | — | 6.0 |
| R-11-B | 3.825 | — |
| Component C: | | |
| Catalyst A | 4.5 | 1.82 |
| Diethylene glycol | 1.5 | — |
| Carbowax 400 | — | 2.42 |
| N,N-dimethylcyclohexylamine | — | 0.36 |
| Throughput, lb./min. | 88 | 93.5 |
| Rise Characteristics: | | |
| Cream, sec. | 0:20 | 0:09 |
| Initiation, sec. | 0:28 | 0:13 |
| Gel, min. : sec. | 1:16 | 1:15 |
| Rise, min. : sec. | 1:55 | 1:45 |
| Tack Free, min. : sec. | 4:20 | 6:00 |
| Firm, min. : sec. | 7:30 | 8:00 |
| Foam Properties: | | |
| Density, pcf | 2.2 | 2.05 |
| Compressive str. (psi) | | |

TABLE III-continued

| Foams | F | G |
|---|---|---|
| ∥ to rise | 34.1 | 25.8 |
| ⊥ to rise | 21.6 | 13.7 |
| % Closed cells | — | 88.7 |
| Friability (% wt. loss) | 18.8 | 36.6 |
| Oxygen Index | 25.1 | 25.4 |
| Mine Safety Burn Through (hr./in.) | 0.77 | 1.2 |
| ASTM E-84 Test on 1" thick samples: | | |
| FSR | 30.8 | 56.4 |
| Smoke | 156 | 105 |

Footnotes to Table III:
[1]Polyol E: The polyol obtained from the esterification of trimellitic anhydride with 1.59 moles of diethylene glycol and subsequent reaction with propylene oxide to lower the acid number below 1; OH E.W. = 170; viscosity = 4828 cps at 25° C; acid # = 0.23.
[2]Carbowax 400: A polyethyleneglycol of molecular weight from 380 to 420 supplied by Union Carbide Corp., 270 Park Avenue, New York, N.Y.

The Polyol E of Foam F and Carbowax 400 of Foam G are both polyols not called for according to the present invention. Consequently, the FSR and smoke values for both foams are considerably higher than the values observed for those foams prepared in accordance with the present invention.

We claim:

1. In a polymer in which the major recurring polymer unit is isocyanurate which polymer comprises the reaction product obtained by bringing together a polymethylene poly(phenylisocyanate), a trimerization catalyst and a minor amount of a polyol the improvement which comprises employing as the polyol component from about 0.05 hydroxyl equivalent to about 0.20 hydroxyl equivalent per equivalent of said polymethylene poly(phenylisocyanate) of a polyol having a hydroxyl equivalent weight from about 150 to about 500 provided the polyol is present in a weight from about 10 to about 30 parts per equivalent of said isocyanate, and said polyol is obtained by the reaction of:
   a. about 0.1 molar to about 0.7 molar excess of a polyethyleneglycol having a hydroxyl equivalent weight from about 75 to about 225 over the stoichiometric amount required for reaction with b. an aromatic polycarboxylic compound containing from two to three carboxylic groups.

2. A polymer according to claim 1 wherein said polycarboxylic compound (b) is phthalic anhydride.

3. A polymer according to claim 1 wherein said polycarboxylic compound (b) is trimellitic anhydride.

4. In a cellular polymer in which the major recurring polymer unit is isocyanurate which polymer comprises the reaction product obtained by bringing together in the presence of a blowing agent, a polymethylene poly(phenylisocyanate), a trimerization catalyst and a minor aount of a polyol the improvement which comprises employing as the polyol component from about 0.05 hydroxyl equivalent to about 0.20 hydroxyl equivalent per equivalent of said polymethylene poly(phenylisocyanate) of a polyol having a hydroxyl equivalent weight from about 150 to about 500 provided the polyol is present in a weight from about 10 to about 30 parts per equivalent of said isocyanate and said polyol is obtained by the reaction of:
   a. about 0.1 molar to about 0.7 molar excess of a polyethyleneglycol having a hydroxyl equivalent weight from about 75 to about 225 over the stoichiometric amount required for reaction with
   b. an aromatic polycarboxylic compound containing from two to three carboxylic groups.

5. A cellular polymer according to claim 4 wherein said isocyanate contains from about 35 percent to about 85 percent by weight of methylenebis(phenylisocyanate), the balance of said isocyanate having a functionality higher than 2.

6. A cellular polymer according to claim 4 wherein said polycarboxylic compound (b) is phthalic anhydride.

7. A cellular polymer according to claim 4 wherein said polycarboxylic compound (b) is trimellitic anhydride.

8. A cellular polymer according to claim 4 wherein said trimerization catalyst is a combination comprising:
   a. a monomeric epoxide;
   b. a tertiary amine trimerization catalyst containing a dimethylamino group; and
   c. a glycine salt having the formula

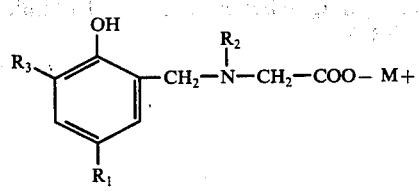

wherein M is an alkali metal, $R_1$ is selected from the class consisting of hydrogen and alkyl having from 1 to 12 carbon atoms, inclusive, $R_2$ is selected from the class consisting of hydrogen, alkyl having from 1 to 12 carbon atoms, inclusive, and $CH_2 COO^- M^+$, and $R_3$ is selected from the class consisting of hydrogen and the group

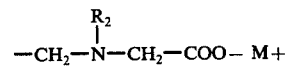

9. A cellular polymer in which the major recurring polymer unit is isocyanurate which polymer comprises the reaction product obtained by bringing together in the presence of a blowing agent:
   A. a polymethylene poly(phenylisocyanate) which contains from about 35 percent to about 85 percent by weight of methylenebis(phenylisocyanate), the balance of said isocyanate having a functionality higher than 2;
   B. a catalytic amount of a trimerization catalyst comprising the combination of:
      i. a glycidyl ether of a novolac resin having a functionality of at least two;
      ii. N,N-dimethylcyclohexylamine; and
      iii. sodium N-(2-hydroxy-5-nonylphenyl)methyl-N-methyl glycinate; and
   C. from about 0.05 hydroxyl equivalent to about 0.20 hydroxyl equivalent per equivalent of said polymethylene poly(phenylisocyanate) of a polyol having a hydroxyl equivalent weight from about 150 to about 500 provided the polyol is present in a weight from about 10 to about 30 parts per equivalent of said isocyanate and said polyol is obtained by the reaction of:
      a. about 0.1 molar to about 0.7 molar excess of a polyethyleneglycol having a hydroxyl equivalent weight from about 75 to about 225 over the stoichiometric amount required for reaction with
      b. trimellitic anhydride.

10. A cellular polymer according to claim 9 wherein said polyisocyanate contains from about 45 percent by weight to about 50 percent by weight of methylenebis(-phenylisocyanate) and the balance of said isocyanate has a functionality higher than 2, and said polyisocyanate is further characterized by having a % hot HCl acidity of less than 0.1%.

11. A cellular polymer in which the major recurring polymer unit is isocyanurate which polymer comprises the reaction product obtained by bringing together in the presence of a blowing agent:

A. a polymethylene poly(phenylisocyanate) which contains from about 45 percent by weight to about 50 percent by weight of methylenebis(-phenylisocyanate) and the balance of said isocyanate having a functionality higher than 2, and said polymethylene poly(phenylisocyanate) further characterized by having a % hot HCl acidity of less than 0.1%;

B. a catalytic amount of a trimerization catalyst comprising the combination of:
  i. a glycidyl ether of a novolac resin having a functionality of at least two;
  ii. N,N-dimethylcyclohexylamine; and
  iii. sodium N-(2-hydroxy-5-nonylphenyl)methyl-N-methyl glycinate; and C. from about 0.05 hydroxyl equivalent to about 0.20 hydroxyl equivalent per equivalent of said polymethylene poly(phenylisocyanate) of a polyol having a hydroxyl equivalent weight from about 200 to about 300 provided the polyol is present in a weight from about 10 to about 30 parts per equivalent of said isocyanate and said polyol is obtained by the reaction of from about 3.2 to about 3.6 moles of tetraethyleneglycol with 1 mole of trimellitic anhydride.

* * * * *